United States Patent [19]

Pederson et al.

[11] Patent Number: 4,946,007

[45] Date of Patent: Aug. 7, 1990

[54] SELF-ENERGIZING BRAKE

[75] Inventors: David F. Pederson; Steven R. Miller, both of Twin Falls, Id.

[73] Assignee: Pedersen Development Co., Twin Falls, Id.

[21] Appl. No.: 240,497

[22] Filed: Jan. 23, 1989

Related U.S. Application Data

[63] Continuation-in-part of Ser. No. 116,291, Nov. 3, 1987, abandoned.

[51] Int. Cl.⁵ .............................................. B62L 1/14
[52] U.S. Cl. ................... 188/24.14; 74/99 A; 74/424.8 NA; 188/72.2; 192/94
[58] Field of Search ............... 188/24.14, 24.15, 24.16, 188/24.21, 72.2, 72.8; 74/99 A, 424.8 NA; 192/94

[56] References Cited

U.S. PATENT DOCUMENTS

| 2,844,969 | 7/1958 | Lahr | 74/424.8 NA |
|---|---|---|---|
| 2,985,259 | 5/1961 | Gardner | 188/72.8 X |
| 3,285,372 | 11/1966 | Rossmann | 188/72.2 |
| 4,022,300 | 5/1977 | Afanador et al. | 192/94 X |
| 4,392,557 | 7/1983 | Franke | 188/72.8 X |
| 4,538,707 | 9/1985 | Schoch | 188/24.22 |
| 4,567,967 | 2/1986 | Crossman | 188/72.8 X |
| 4,597,474 | 7/1986 | Nagano | 188/24.21 |
| 4,768,623 | 9/1988 | Nagano | 188/24.21 X |

FOREIGN PATENT DOCUMENTS 55-63022  5/1980  Japan ................................. 188/72.2

Primary Examiner—George E. A. Halvosa
Attorney, Agent, or Firm—Finnegan, Henderson, Farabow, Garrett & Dunner

[57] ABSTRACT

A self-energizing brake which includes opposed rocker arms attached to a frame by a bolt or the like. The rocker arms also include a housing extending transversely therefrom which is rotatable about the bolt. The housing encloses a tubular member having a plurality of helical ridges which mate with a plurality of bearings disposed about the inner surface of the housing. The housing is axially movable relative to the bolt. The housing is sealed about the bolt by O-rings and contains a lubricant such as grease. Friction pads extend from each rocker arm adjacent the rim of a tire to contact the rotating rim as the rocker arms are related. Such rotation results in movement of the housing in an axial direction as the rim drags the friction pads forward. This axial motion of the housings caused by the drag of the friction pads on the tire rim is transferred into rotational motion of the rocker arms by the cooperating relationship of helical ridges and bearings to thereby increase the pressure of the friction pads against the tire rim.

20 Claims, 2 Drawing Sheets

4,946,007

SELF-ENERGIZING BRAKE

RELATED APPLICATIONS

This application is a continuation-in-part of U.S. patent application Ser. No. 116,291 filed Nov. 3, 1987, now abandoned.

BACKGROUND OF THE INVENTION

1. Field of the Invention

The present invention relates to brakes and, more particularly, to brakes for bicycles of the disc/rotor or rim type which are self-energizing.

2. Description of the Related Art

In drum brakes for bicycles incorporated in the hub of the wheel, the drag in the shoe from the rotation of the wheel can be used to supplement the brake applying force, and drum brakes based on this principle work effectively. There are in existence some so-called "self-applying" brakes in which the drag from the rotation of the wheel causes an increase in braking force by the intermediary of a wedge, but these brakes today have not proved to be very effective since the wedges tend to jam.

SUMMARY OF THE INVENTION

Accordingly, it is an object of the present invention to provide a self-energizing braking mechanism in which the braking force is enhanced by a transfer of the rotational energy of the moving surface to the pressure exerted by the brake pads.

It is a further object of the invention to provide a self-energizing brake for bicycles which requires a minimum number of parts, eliminates any tendency to wedge closed, and permits quick-release of the tire and rim for operational efficiency.

It is yet another object of the present invention to provide a self-energizing brake kit which may be retrofit on existing bicycle brakes.

It is still a further object of the invention to improve the braking action for rider control and safety.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

To achieve the foregoing objects, and in accordance with the purposes of the invention as embodied and broadly described herein, there is provided, in a bicycle having a frame and at least one tire mounted on a rim, a self-energizing brake comprising a pair of rocker arms each having a friction pad extending therefrom, and means for rotatably mounting each of the pair of rocker arms adjacent opposite sides of the tire rim such that the friction pads are movable into and out of contact with respective the sides of the rim as the rocker arms are rotated in a first direction. A pair of tubular members, each having an outer surface, are provided which are disposed on the mounting means to extend transversely on opposite sides of the tire rim. The brake further includes a housing, integral with and extending transversely from each of the rocker arms and surrounding a respective one of the tubular members. Each housing includes an inner surface. Either the outer surfaces of the tubular members or the inner surfaces of the housings being provided with a plurality of helical ridges formed thereon, and the other of the tubular members and housings being configured with means for cooperating and mating with the helical ridges to move the housings axially relative to their respective tubular members as the rocker arms are rotated, while simultaneously further rotating the rocker arms to increase the pressure of the friction pads against the rim of the tire.

In a preferred embodiment, the cooperating means comprises a plurality of bearings spaced circumferentially about the inner surface of the housing.

The present invention further comprises a self-energizing brake kit for retrofit installation on a bicycle having a frame, at least one tire mounted on a rim, and a pair of tubular mounting posts extending from the frame on opposite sides of the tire rim. The kit includes a pair of rocker arms each having a friction pad extending therefrom, and means for rotatably mounting each of the pair of rocker arms on a respective one of the mounting posts. The kit still further includes a pair of tubular members, each of the tubular members having an outer surface, and housings integral with and extending transversely from each of the rocker arms, for surrounding a respective one of the tubular members. The housings include an inner surface. Either the outer surfaces of the tubular members or the inner surfaces of the housing are provided with a plurality of helical ridges formed thereon, and the other one being configured with means for cooperating and mating with the helical ridges to move the housings axially and circumferentially relative to a respective tubular member as the housing and respective tubular member are rotated relative to one another.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

DESCRIPTION OF THE PREFERRED EMBODIMENT

Figure 1:
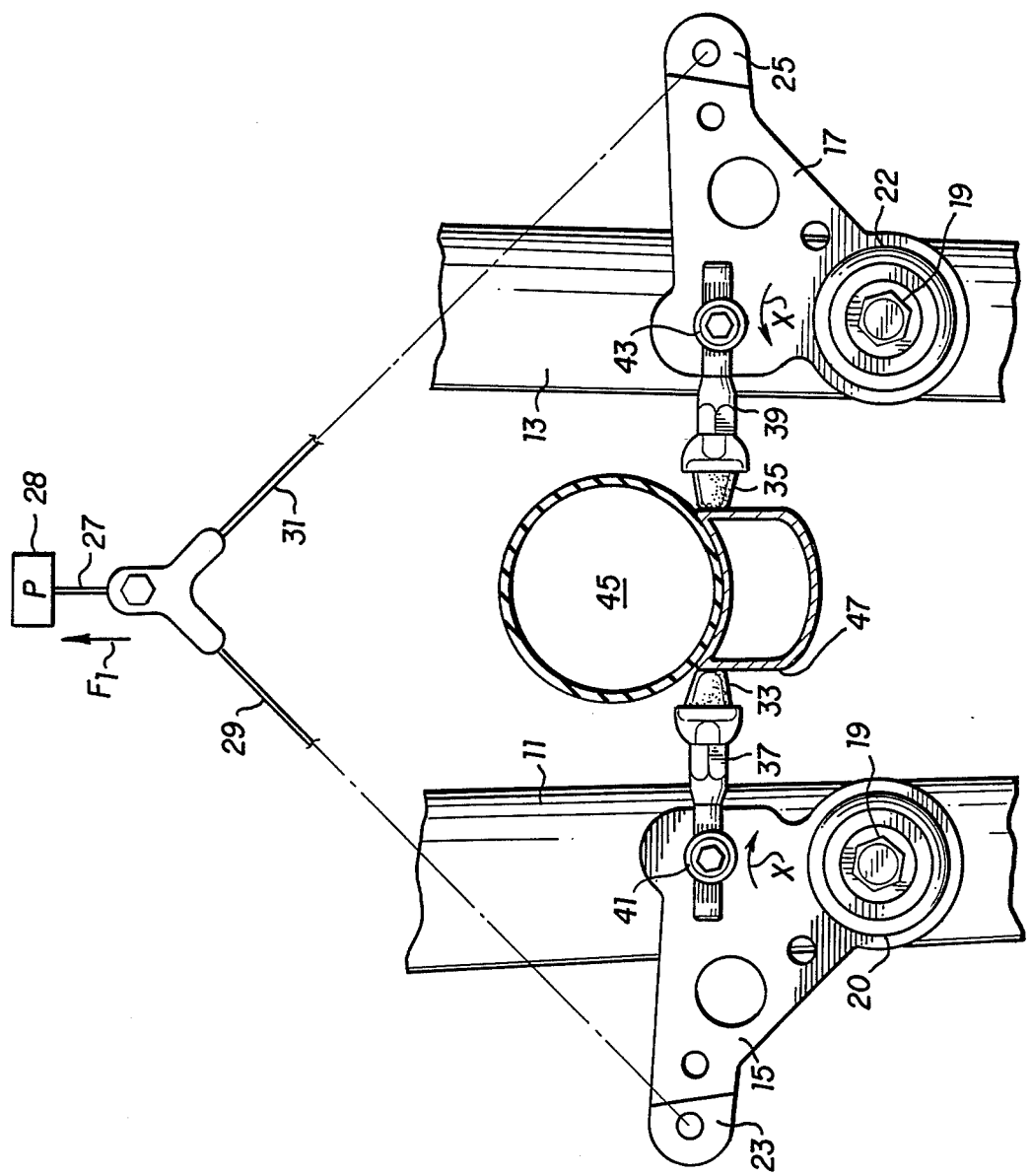
FIG. 1 is a diagrammatic illustration of the braking system of the present invention.

Reference will now be made in detail to the presently preferred embodiment of the invention as illustrated in the accompanying drawings, in which like reference characters designate like or corresponding parts throughout the several drawings.

FIG. 1 is a diagrammatic view showing the use of the mechanism of the present invention relative to the front wheel of a bicycle. While a bicycle system is disclosed for purposes of describing the invention, it is to be understood that the present invention is also applicable to braking systems for other types of mechanical devices.

With reference to FIG. 1, stays 11 and 13 comprise forks for supporting a front tire 45 and rim 47 of a bicycle. The selfenergizing brake of the present invention includes rocker arms 15 and 17, and a pair of friction pads 33 and 35, disposed on the distal ends of arms 37 and 39 which extend from respective rocker arms 15 and 17. Arms 37 and 39 are mounted on respective rocker arms 15 and 17 by means of bolts 41 and 43, respectively. Bolts 41 and 43 may be loosened to adjust the spacing and orientation of friction pads 37 and 39 relative rim 47.

Figure 2A:
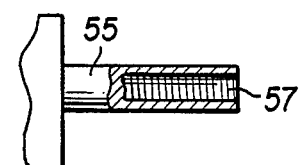
FIG. 2a is a side elevational view of the post used in FIG. 2.

In accordance with the present invention the brake includes means for pivotably mounting each of the pair of rocker arms adjacent opposite sides of the tire rim such that the friction pads are movable into and out of contact with respective sides of the tire rim as the rocker arms are rotated in a first direction. As embodied herein, and with reference to FIGS. 2 and 2a, the mounting means includes tubular mounting post 55 having a threaded interior surface 57. Tubular mounting posts 55 are fixed to and extend from respective ones of stays 11 and 13. By way of example and not limitation, mounting posts 55 may be welded to each of stays 11 and 13 to extend therefrom. The mounting means further includes a threaded bolt 19 and spacer 49. Threaded bolt 19 is received in threaded interior surface 57 of tubular mounting post 55 to mount rocker arms 15 and 17 on opposite sides of the tire rim as will be described in more detail below.

Figure 2:
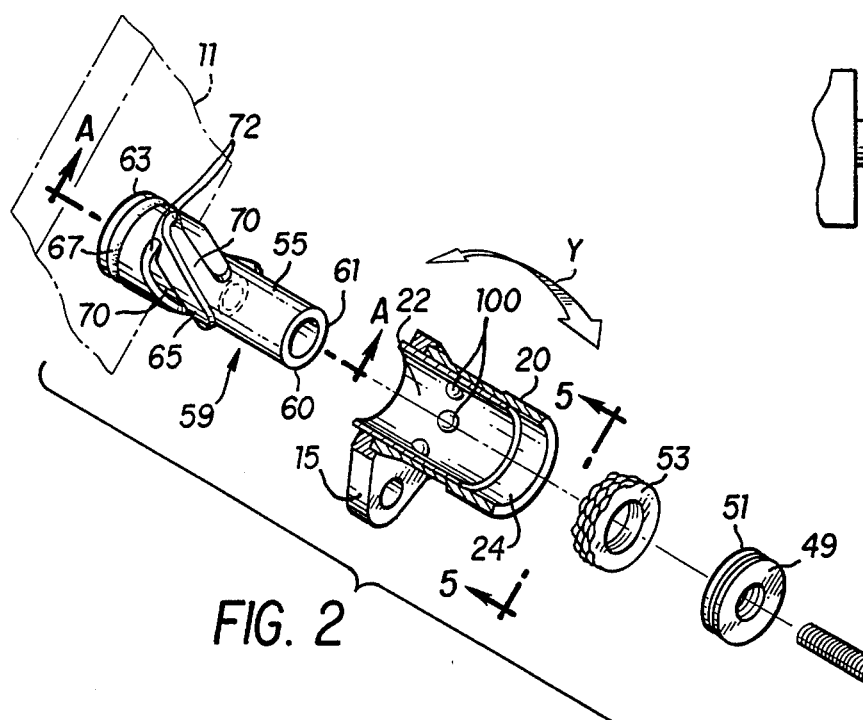
FIG. 2 is an exploded view of one of the self-energizing components used in the present invention.
Figure 3:
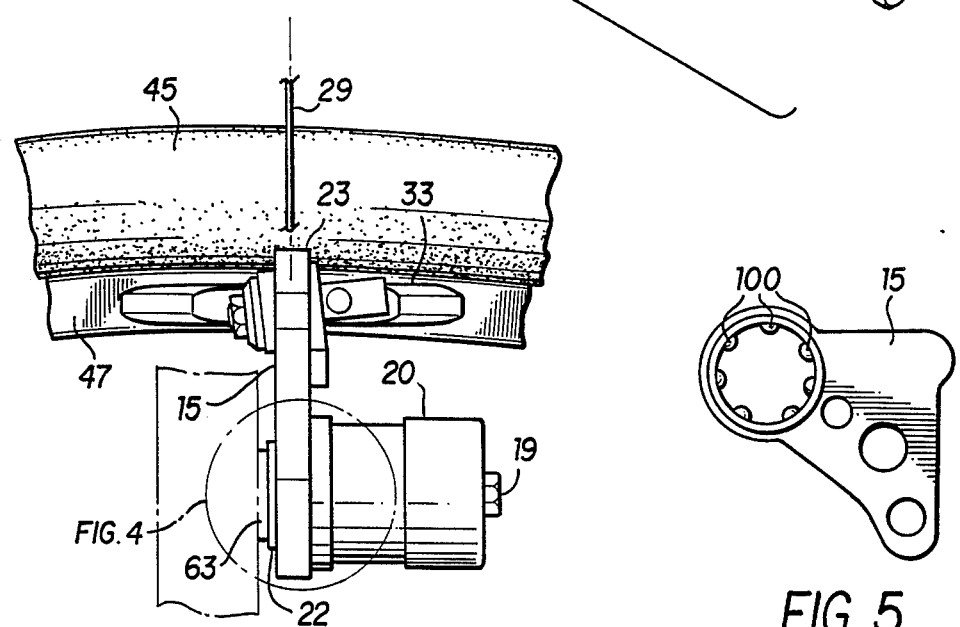
FIG. 3 is a partial side elevational view of the mechanism of FIG. 2 when the brakes are applied.

The brake of the present invention further includes a pair of tubular members 59 which are disposed on the mounting means to extend transversely on opposite sides of the tire rim as illustrated in FIG. 2. Each of the tubular members extending transversely on opposite sides of the tire rim are substantially the same and only one is illustrated. Each tubular member 59 has an outer surface 61 configured with a plurality of helical ridges 65 thereon. Helical ridges 65 extend from proximate end 63 of tubular member 59 toward distal end 60 of tubular member 59 and define a plurality of channels 70 therebetween. Each channel 70 includes a notch portion 72 at the proximate end thereof. The notch portions 72 extend circumferentially about outer surface 61 of tubular member in a direction opposite to the direction of rotation of the rocker arms when applying the brake. In other words, notch portions 72 form an abrupt angle with the helical progression of channels 70 at the proximate ends thereof. The function of notch portions 72 will be described hereinafter.

The brake of the present invention further includes a housing 20 integral with and extending transversely from each of the rocker arms 15 and 17 for surrounding a respective one of tubular members 59 when assembled. Housings 20 include an inner surface 22 configured with means for cooperating and mating with helical ridges 65 of respective ones of the tubular members to move the housings axially relative to the respective tubular member as the rocker arms are rotated, while simultaneously further rotating the rocker arms to increase the pressure of the friction pads against the rim. As embodied herein, and with reference to FIGS. 2 and 5, the cooperating means comprises a plurality of bearings 100 spaced circumferentially about inner surface 22 of housing 20 as illustrated in FIG. 2. The relative motion of housing 20 and tubular member 59 which provides the self-energizing action of the present invention during the brake applying procedure will be described in detail below.

In an alternative embodiment of the present invention, inner surface 22 of housings 20 may be configured with helical ridges, and outer surface 61 of tubular member 59 may be configured with bearings 100. The following description of the operation of the present invention as it relates to the self-energizing feature is applicable to either embodiment.

Rocker arms 15 and 17 also include terminal cantilever portions 23 and 25. These cantilever portions are connected to a brake cable 27 by means of connecting cables 29 and 31 as shown in FIG. 1. Pressure exerted through cable 27 causes each of rocker arms 15 and 17 to rotate about a pivot point coincident with bolts 19. Pressure is applied through cable 27 by a mechanism 28. By way of example and not limitation, mechanism 28 may comprise a hand lever of the type commonly used on bicycles. Rotation of rocker arms 15 and 17 may be accomplished in numerous other fashions, for instance pneumatically, hydraulically or electrically while remaining within the scope of the present invention.

When the pressure is applied to cable 27 a force F1, transferred through cables 29 and 31, causes rocker arms 15 and 17 to rotate clockwise and counterclockwise, respectively, in a first direction as viewed in FIG. 1.

Pads 33 and 35 are brought into contact with rotating rim 47 as rocker arms 15 and 17 are rotated. Pads and posts 37 and 39 are drawn forwardly due to the momentum associated with the rotating rim 47 and the frictional contact between the pads 33 and 35 and rim 47. This forward motion is transferred to rocker arms 15 and 17 acting in course to urge integral housings 20 axially relative to tubular member 59 which is fixed on its respective mounting means. This axial motion of housing 20 and rocker arms 15 and 17 relative to mounting posts 59 slides bearings 100 along helical ridges 65 and channels 70 to thereby simultaneously rotate housings 20 and rocker arms 15 and 17 in the first direction to increase the pressure of pads 33 and 35 against rim 47. It is precisely this transfer of axial movement of the rocker arms and housings into rotational movement of the rocker arms and housings via the cooperating relationship of helical ridges 65 and bearings 100 which provides the self-energizing braking effect of the present invention.

As bearings 100 travel along channels 70 toward proximate end 63 of tubular member 59, they will eventually align with notch portions 72 which extend circumferentially about outer surface 61 of tubular member 59. Since notch portions 72 extend circumferentially in a direction opposite the direction in which rocker arms 15 and 17 are rotated to bring friction pads 33 and 35 into contact with tire rim 47, bearings 100 may be moved into notch portions 72 by rotating rocker arms 15 and 17 in the second direction to move friction pads 33 and 35 away from tire rim 47 to increase the clearance therebetween in the brake-released state. This additional clearance may be required to remove the tire and rim from between friction pads 33 and 35 and stays 11 and 13. In this manner, the tire and rim may be removed from the bicycle without the need to loosen bolts 19 of the mounting means thereby facilitating quick-release features which may be incorporated in the means for mounting of the bicycle. The length of extension of notch portions 72 may be selected in accordance with the amount of clearance required to remove tire 45 from between friction pads 33 and 35.

With continued reference to the exploded view of the brake of the present invention illustrated in FIG. 2, the brake of the present invention may include spring means, disposed in each of the housings, for biasing the housing axially along the tubular member to rotate the rocker arms in a second direction, opposite the first direction, and to move the friction pads out of contact with the tire rim. As embodied herein, the spring means includes a compression spring 53 which fits within housing 20 and seats on one side thereof on a ledge 24 configured on inner surface 22 of housing 20. Compression spring 53 contacts spacer 51 on the opposite side thereof.

When assembled, bolt 19 fits through circular openings in spacer 51 and compression spring 53 and through the interior of housing 20 and tubular member 59 where it is received in the threaded interior surface 57 of mounting post 55. Similarly, distal end 60 of tubular member 59 extends through the interior of housing 20 and through compression spring 53 to abut spacer 49. In this manner, rocker arms 15 and 17 and their respective housings 20 are rotatably received on tubular members 59, and compression spring 53 acts to bias housing 20 and the rocker arms towards proximate end 63 of tubular member 59. This biasing action of compression spring 53 further acts to move bearings 100 within the channels 70 defined by helical ridges 65 to thereby rotate housing 20 and its respective arm 15 or 17 in a second direction, opposite the first direction, to move friction pads 33 and 35 away from tire rim 47 to a released state.

The brake of the present invention further includes means for sealing the helical ridges of the tubular member and the cooperating means of the housing. As embodied herein, the sealing means comprises an O-ring 67 which seats in a depression formed at the proximate end of tubular member 59, and a second O-ring 51 which seats in a depression of spacer 49. With the brake in the assembled state, the O-ring 67 seals the connection between inner surface 22 of housing 20 and outer surface 61 of tubular member 59, and O-ring 51 seals the opposite end of housing 20 to thereby seal the mating engagements of bearings 70 and helical ridges 65.

When the apparatus of FIG. 2 is assembled, male member 59 is secured in a fixed stationary position to frame 11 when bolt 19 is mated with threaded bore 57 and tightened. Housing 20 is axially and rotatably movable relative to male member 59, as indicated by arrow Y.

Figure 5:
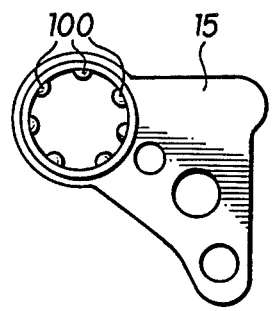
FIG. 5 is a front view of the brake of the present invention taken along line 5—5 of FIG. 2.
Figure 4:
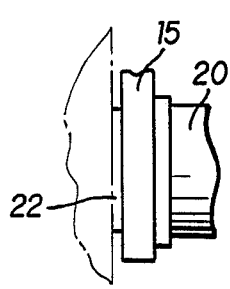
FIG. 4 is a partial sectional view of the mechanism of FIG. 3 illustrating the position of the mechanism when the brakes are at rest.
Figure 6:
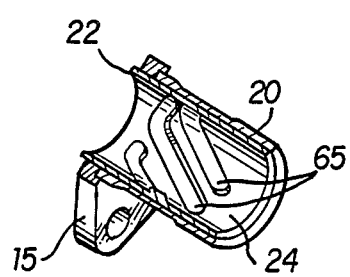
FIG. 6 is a sectional view of a housing having the grooves formed on the inner surface thereof.

FIG. 4 is an illustration of the preferred embodiment of the present invention at rest, i.e., without the brakes applied. Flange 22 is of a dimension so as to limit the movement of housing 20 relative to male member 59. It is to be understood that the illustration of FIG. 5 is exaggerated since the relative movement between the helical ridges is quite small and large axial movement of the housing is not required to cause the selfenergization feature of the brake of the present invention.

As will be apparent, the pitch angle of the helical ridges will have a direct bearing on the amplitude of the exerted force of friction pads 33 and 35 on rim 47 since that pitch angle is proportional to the amount of rotational movement of housing 20 and rocker arms 15 and 17 for each unit of axial movement of housing 20 along tubular member 59. The pitch angle for use with the present invention is preferably between 20° and 70°, with a pitch angle between 40° and 45° being preferred.

Additional advantages and modifications will readily occur to those skilled in the art. For instance, the configuration of bearings 100 may be changed so long as the bearings move freely in channels 70. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. In a bicycle having a frame and at least one tire mounted on a rim, a self-energizing brake comprising:
    a pair of rocker arms each having a friction pad extending therefrom;
    means for rotatably mounting each of said pair of rocker arms adjacent opposite sides of said tire rim such that said friction pads are movable into contact with respective sides of said rim as said rocker arms are rotated in a first direction;
    a pair of tubular members fixed to said mounting means to extend transversely on opposite sides of said tire rim, each said tubular member having an outer surface;
    a pair of housings, each housing being integral with and extending transversely from one of said rocker arms and surrounding a respective one of said tubular members, each said housing having an inner surface;
    one of said outer surfaces of said tubular members and said inner surfaces of said housings being configured with a plurality of helical ridges thereon, and the other one of said outer surfaces of said tubular members and said inner surfaces of said housings being configured with means for cooperating and mating with said helical ridges to move said housings axially along and rotate said housings relative to the respective tubular member as said rocker arms are rotated to increase the pressure of said friction pads against said rim.

2. The bicycle of claim 1, wherein said cooperating means comprises a plurality of bearings spaced circumferentially about said other one of said outer surfaces of said tubular members and said inner surfaces of said housings.

3. The bicycle of claim 1, wherein said plurality of helical ridges define helical channels therebetween, each said channel having a circumferentially extending portion at the proximate end thereof for receiving said cooperating means to permit rotation of said rocker arms and said housings in a second direction, opposite said first direction.

4. The bicycle of claim 3, wherein said cooperating means comprises a plurality of bearings spaced circumferentially about said other one of said outer surfaces of said tubular members and said inner surfaces of said housings, said bearings being received in respective ones of said channels formed by said helical ridges.

5. The bicycle of claim 1, wherein said mounting means comprises a pair of stays extending from said frame on opposite sides of said tire rim, and means for fixedly securing said tubular members to respective ones of said stays.

6. The bicycle of claim 5, wherein said securing means includes a tubular mounting post, having a threaded interior surface, fixed to and extending from each of said stays, and a threaded bolt received in said tubular mounting post, said tubular member being fixedly held on said tubular mounting post by said threaded bolt.

7. The bicycle of claim 1, including spring means, disposed in each said housing, for biasing said housing axially along said tubular member to rotate said rocker arms in a second direction, opposite said first direction, and move said friction pads out of contact with said tire rim.

8. The bicycle of claim 1, including means for sealing said helical ridges and said cooperating means.

9. The bicycle of claim 8, including lubricating means disposed between said helical ridges and said cooperating means.

10. The bicycle of claim 1, wherein said helical ridges have a pitch angle between about 20°-70° and preferably between about 40°-45°.

11. The bicycle of claim 1, wherein said helical ridges are formed on said outer surfaces of said tubular members.

12. The bicycle of claim 1, wherein said helical ridges are formed on said inner surfaces of said housings.

13. A self-energizing brake kit for installation on a bicycle having a frame, at least one tire mounted on a rim, and a pair of tubular mounting posts fixed to and extending from said frame on opposite sides of the tire tim, comprising:
   a pair of rocker arms each having a friction pad extending therefrom for selectively engaging with opposite sides of the tire rim when mounted on the bicycle to provide a braking action to the tire;
   means for rotatably mounting each of said pair of rocker arms on a respective one of said mounting posts such that said friction pads are movable into contact with said tire rim upon rotation of said rocker arms in a first direction;
   a pair of tubular members for being fixedly mounted on said tubular mounting posts, each said tubular member having an outer surface;
   a pair of housings, each said housing being integral with and extending transversely from one of said rocker arms, for surrounding a respective one of said tubular members, each said housing having an inner surface;
   one of said outer surfaces of said tubular members and said inner surfaces of said housings being configured with a plurality of helical ridges thereon, and the other one of said outer surfaces of said tubular members and said inner surfaces of said housings being configured with means for cooperating and mating with said helical ridges to move said housings axially along and rotate said housings relative to said respective tubular member thereby increasing the pressure of said friction pads against said tire rim as said housing and respective tubular member are rotated relative to one another by the drag of the tire rim against the friction pad.

14. The self-energizing brake kit of claim 13, wherein said cooperating means comprises a plurality of bearings spaced circumferentially about said other one of said outer surfaces of said tubular members and said inner surfaces of said housing.

15. The self-energizing brake kit of claim 13, wherein said plurality of helical ridges define helical channels therebetween, each said channel having a circumferentially extending portion at the proximate end thereof for receiving said cooperating means to permit rotation of said rocker arms and said housings in a second direction, opposite said first direction.

16. The self-energizing brake kit of claim 15, wherein said cooperating means comprises a plurality of bearings spaced circumferentially about said other one of said outer surfaces of said tubular members and said inner surfaces of said housing, said bearings being received in respective ones of said channels formed by said helical ridges.

17. The self-energizing brake kit of claim 13, including spring means for biasing said housing in a first axial direction relative said respective tubular member.

18. The self-energizing brake kit of claim 13, wherein said helical ridges have a pitch angle between about 20°-70° and preferably between about 40°-45°.

19. The self-energizing brake kit of claim 13, wherein said helical ridges are formed on said outer surfaces of said tubular members.

20. The self-energizing brake kit of claim 13, wherein said helical ridges are formed on said inner surfaces of said housings.

* * * * *